United States Patent
Leoppold et al.

(10) Patent No.: US 11,686,079 B2
(45) Date of Patent: Jun. 27, 2023

(54) CONTAINER FOR A TOILET RIM BLOCK CAGE

(71) Applicant: BUCK-CHEMIE GMBH, Herrenberg (DE)

(72) Inventors: Joachim Leoppold, Reutlingen (DE); Frank Brunecker, Rottenburg (DE); Fritz Matthias, Gomaringen (DE); Sascha Hermann, Herrenberg (DE)

( * ) Notice: Subject to any disclaimer, the term of this patent is extended or adjusted under 35 U.S.C. 154(b) by 366 days.

(21) Appl. No.: 16/970,096

(22) PCT Filed: Mar. 6, 2019

(86) PCT No.: PCT/EP2019/055529
§ 371 (c)(1),
(2) Date: Aug. 14, 2020

(87) PCT Pub. No.: WO2019/170724
PCT Pub. Date: Sep. 12, 2019

(65) Prior Publication Data
US 2021/0025153 A1    Jan. 28, 2021

(30) Foreign Application Priority Data

Mar. 9, 2018 (DE) .......................... 102018105474.2
Apr. 18, 2018 (DE) .......................... 102018109257.1

(51) Int. Cl.
*E03D 9/03* (2006.01)
*B29C 51/00* (2006.01)
*E03D 9/02* (2006.01)

(52) U.S. Cl.
CPC ............ *E03D 9/032* (2013.01); *B29C 51/002* (2013.01); *E03D 2009/024* (2013.01); *E03D 2009/026* (2013.01); *E03D 2009/028* (2013.01)

(58) Field of Classification Search
CPC . B29C 51/087; B29C 51/264; C11D 17/0056; E03D 13/00; E03D 13/005; E03D 13/007; E03D 2009/024–026; E03D 9/032; E03D 9/033; E03D 9/038
See application file for complete search history.

(56) References Cited

U.S. PATENT DOCUMENTS

2017/0247869 A1*  8/2017  Soller .................... E03D 9/032

FOREIGN PATENT DOCUMENTS

| CH | 628384 | * | 2/1982 | ............ E03D 9/032 |
|---|---|---|---|---|
| DE | 3752353 | | 10/2002 | |
| EP | 0773330 | * | 5/1997 | ............ E03D 9/032 |
| EP | 3121342 | | 1/2017 | |
| EP | 3263785 | * | 1/2018 | ............... E03D 9/02 |
| EP | 3214232 | | 9/2019 | |
| GB | 1191780 | | 5/1970 | |

(Continued)

*Primary Examiner* — David P Angwin
*Assistant Examiner* — Nicholas A Ros

(57) ABSTRACT

The invention relates to a method for producing a container (11) with at least one opening (13) for storing cleaning agents for a toilet rim block cage (30), wherein a polymer film (20) is provided, and at least one opening (13) is punched into the polymer film (20). The at least one opening (13) is closed by a substantially gas-tight and removable closure material (21), and the film (20) together with the closed opening (13) is then three-dimensionally deformed by means of thermoforming. The invention also relates to the container (11).

7 Claims, 5 Drawing Sheets

(56) References Cited

FOREIGN PATENT DOCUMENTS

Figure 1:
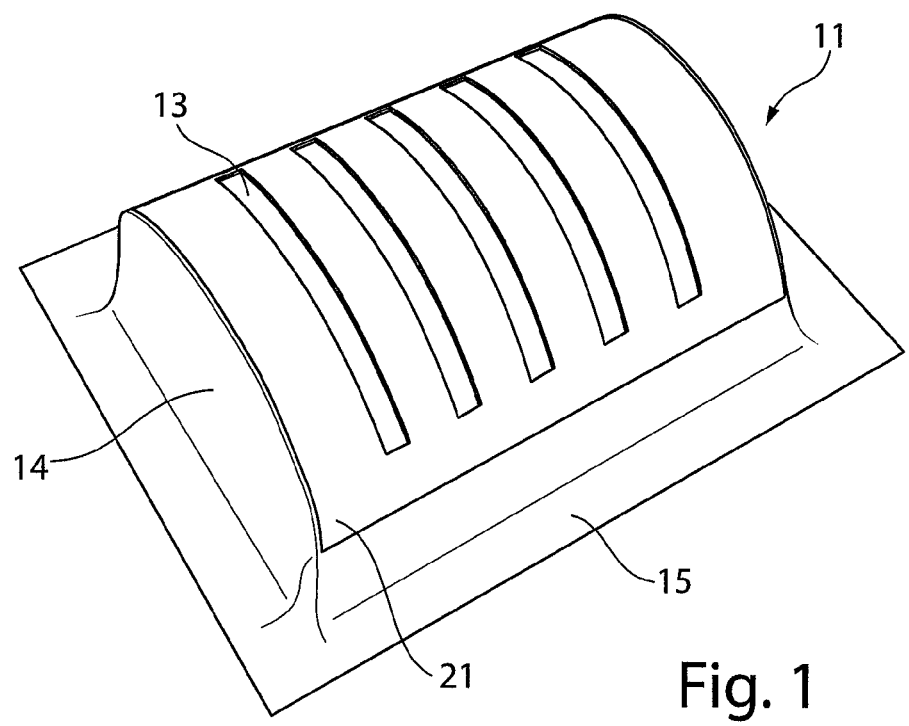

| | | |
|---|---|---|
| WO | WO2012010421 | 1/2012 |
| WO | WO2016040341 | 3/2016 |
| WO | WO2018009336 | 1/2018 |

* cited by examiner

CONTAINER FOR A TOILET RIM BLOCK CAGE

The present invention relates to a container having openings for storing cleaning agents for toilet rim block cages, the manufacturing process and such a container for a toilet rim block cage having cleaning agents and the packaging.

A majority of the known piecewise cleaning agents are so-called "rim blocks", which are fixed in basket- or cage-like containers having a hook-shaped suspension device, the so-called toilet basket, on the rim of the toilet. The containers have inlet and outlet openings for the flush water. The agent found in the container is washed over by the flush water with every flushing process. In this way, a small portion of the cleaning agent is dissolved with the release of surfactants, fragrances etc with every flush, whereby the desired cleaning of the toilet bowl and the toilet sump and the desired fragrancing can then be achieved.

In general, the cleaning agents have fragrances and are coloured for a visually appealing appearance.

In the prior art, there is a plurality of different toilet baskets. Many toilet baskets have two shell-halves having inlet and outlet openings which are connected to each other with a hinge, such that the toilet basket can be opened and closed and the basket can be filled again after the agent has been used.

Furthermore, there are refillable baskets which have an opening which is open at the top or the side, through which new piecewise toilet cleaning agents can be inserted into the basket after consumption.

Furthermore, there are single-use baskets which are thrown away after the consumption of the agent. In the case of the single-use baskets, there are in turn toilet baskets where, when they are manufactured, the piecewise cleaning agent is enclosed in the basket during the manufacturing. Such a basket is disposed of as a whole after emptying.

In a variant of such single-use baskets, the containers are shell-like, and the cleaning agent is poured into the shell-like container as a melt during manufacturing and then solidifies. After emptying, the empty container and, where applicable, also the suspension device located on it are thrown away.

The toilet baskets are generally available together with the cleaning agents in a blister package. The blister package serves not only to fix the toilet basket and the cleaning agent to the blister card, but also to prevent an evaporation of the fragrances from the cleaning agent.

Toilet baskets which generally have openings for letting water in and out are often manufactured by means of injection moulding. The injection-moulded baskets are dimensionally stable and visually appealing and can be manufactured in a plurality of shapes. However, the manufacturing process is very complex, a relatively large amount of plastic is used to manufacture such a basket and additionally, a new injection mould has to be manufactured to change the shape of the basket in each case, which is expensive.

A container for a toilet cleaning agent is known from EP 3 121 342 A1, which has two shell halves connected by a hinge, wherein one shell half has one or several half shells for receiving cleaning agents and does not have any apertures, and the other shell half has depressions with apertures on the side opposite the half shell, through which the flush water can get to the surface of the agent located in the bowls and can dissolve it. The apertures are located in an even surface of the depression in the other shell half.

In its closed state, each half shell and the depression with the aperture form a chamber to receive the cleaning agent. This container is clamped on the rim of the toilet bowl.

Due to the design of the container, this can be manufactured by thermoforming and punching from a film, such that such containers can be manufactured simply and with little material expenditure, and thus cost-effectively.

After the cleaning agent has been received in this container in the closed half shell and the water gets to the cleaning agent only by means of the entry of the flush water through the apertures in the depressions on the opposite side, the cleaning agents are not rinsed away in a good enough manner in such a container.

Due to the design, it can result in flush water remaining in the container and thus the active substance cannot develop properly.

EP 3 214 232 A1 also discloses a toilet basket which can be manufactured by thermoforming and punching. In order to guarantee the discharge of the flush water, this toilet basket has, in the operating position, a gap between the first and the second shell halves in the lower region, through which the flush water can leave the basket.

A toilet basket is known from WO 2018/009336 A1, which has a suspension device having a detachable latch element and a blister-like cartridge having a corresponding latch element, such that the cartridge can be connected to the suspension device and the cartridge can be removed from the suspension device after emptying and can be replaced by a new cartridge. The cartridge has a shell and a cover, and the cleaning agent is located in the shell, said cleaning agent being able to be poured into the shell. For operationalisation, the cover is removed from the shell and the suspension device with the cleaning agent in the shell is hung in the toilet bowl. The shell is closed up to the big inlet opening and is manufactured by thermoforming.

This toilet basket with replaceable cartridge is hygienic and environmentally friendly, since it enables the reuse of the suspension device, and the container for the cleaning agent, which reaches into the toilet bowl and could possibly become dirty, is thrown away. Contributing to the environmental friendliness and the low manufacturing costs is the fact that the shell is manufactured from a film by thermoforming, which is cost-effective and whereby—compared to the injection moulding—a significant amount of plastic can be saved.

However, it is disadvantageous also in the case of this toilet basket that the agent does not rinse away in a good enough manner.

A method for filling a sanitary agent in a container is known from EP 3 263 786 A1. Firstly, a container body, which has slits and serves to receive gel-like sanitary agents, is provided. Subsequently, a water-soluble material is placed in the container over the slits, in order to cover the slits. The gel-like sanitary agent is now poured into the container and solidifies there. The container with the gel poured in is now fixed to the suspension device and hung in the toilet bowl. With the first flush, the water-soluble material located in the slits dissolves and water gets through the slits to the gel-like cleaning agent.

The manufacturing of the container occurs by injection moulding.

This method enables cast gels to be provided in shells with slits, wherein as a result of the slits, the gels rinse away well during use. The gel shells can be removed from the suspension device after emptying and can be thrown away and replaced by a new filled gel shell.

However, this method is complex and cost-intensive.

The object of the present invention is to specify a simple and cost-effective method for manufacturing a container for toilet cleaning agents with good solubility behaviour and to provide a cost-effective and environmentally friendly container for cleaning agents for toilet rim block cages.

This object is solved by the features of claims 1 and 6.

The container for toilet cleaning agents in accordance with the invention has openings for a good degree of rinsability and can be manufactured cost-effectively and in an environmentally friendly manner by means of thermoforming.

In the manufacturing method according to the invention, one or more openings are punched into a polymer film, and the opening(s) are subsequently sealed again with a removable sealing material which is substantially gas-tight. The film with the sealed opening(s) is then formed into the desired three-dimensional container shape, which is preferably shell-shaped, in a thermoforming process.

The first step of the method according to the invention is the punching of the opening(s) in an even polymer film, which is simple and cost-effective to achieve. The passage of water through these openings into the interior of the container to the cleaning agent to be dissolved should take place in the finished container later during usage.

However, the openings punched into the film which is inherently gas-tight cause the film with the openings not to be able to be shaped by means of the thermoforming process into the desired shape, in particular shell-shape, since due to the openings, no shaping of the heated film can take place by means of compressed air or negative pressure.

This problem is solved in accordance with the invention by the punched openings being sealed in a substantially gas-tight manner with a removable sealing material, such that the composite of polymer film and the substantially gas-tight sealing material is formed during the thermoforming process by means of negative pressure or compressed air and the vacuum can be maintained, such that the treated polymer film thus exactly replicates the desired three-dimensional container shape, for example, a shell shape.

In this way, one obtains a container, formed from the polymer film, with openings which are covered with the removable sealing material. Such a container, which is, for example, shell-shaped, can now be filled with a hot gel mass, for example, which then cools.

The container with the cleaning agent which has been poured in or which has been filled in another way can then be sealed with a container lid. Preferably, the container lid is also made of the polymer material and is connected in a substantially gas-tight manner to the thermoformed container, for example, by adhering. The container lid can also be a film which seals the container opening in a substantially gas-tight manner.

Such a container with cleaning agent which is sealed by a lid can then be connected, in particular clipped, hooked or latched, to a corresponding suspension device, which serves for fixing on the toilet rim. In this way, it is made possible that the container with the cleaning agent and, where applicable, the lid can be disposed of after it has been emptied, and the suspension device, to which a new container filled with cleaning agent can be fixed, can be reused.

In this way, the container, which projects into the toilet bowl and is considered unhygienic by the user, can be thrown away after emptying, but the suspension device, which does not project into the toilet pan and is not very dirty, can be reused.

The container with the cleaning agent and/or the container lid preferably have means to detachably fix the suspension device. In a first cost-effective variant, the container is simply hung in hooks, which are provided on the suspension device, by means of corresponding slits provided on the lid. After emptying, the container is taken from the hooks on the suspension device and can be replaced by a new container with cleaning agent.

In a further variant, the container with the cleaning agent and the lid is latched, hooked or clipped to the suspension device. Other fixing types such as pushbuttons, karabiners or magnetic closures are also possible.

By means of the method according to the invention, the provision of a cost-intensive punching unit for punching three-dimensional containers thermoformed from a polymer film, which would be necessary in a necessary punching step after the thermoforming, is omitted.

A further substantial advantage of the present invention is that the container formed from the punched polymer film with the gas-tight sealing material and the container lid are also substantially gas-tight, such that volatile connections such as, for example, fragrances in a cleaning agent located in the container with a cover cannot evaporate.

In this way, the container sealed with the gas-tight sealing material meets the requirements for a substantially gas-tight packaging, i.e. the container sealed with the gas-tight sealing material and with a cover can be provided without further blister packaging in a normally not gas-tight packaging such as cardboard packaging, and the usual blister film and the costs associated with it are eliminated. The "packing" of the cleaning agent into a water-soluble film, which serves to avoid a leakage of the fragrances and a contamination of the hands when handling is not necessary either.

If desired, the container lid can also be manufactured, like the container made of a polymer film, with the punching of opening for the passage of water, subsequent lamination or sealing of the openings with a preferably water-soluble sealing material and, where applicable, subsequent formations.

Such a container with a container lid and freely rinseable openings on both sides enables a very good entry of the flush water from both sides and thus a good dissolution of the cleaning agent.

A further advantage is that the cleaning agents packaged in the container according to the invention are not only gas-tight, but at the same time are also childproof.

By way of example, a water-soluble polymer material, in particular a water-soluble polymer film, but also a self-adhesive label or a pull tab can be used as a gas-tight, removable sealing material.

For manufacturing toilet rim block cages with openings in the containers, it is preferable to use a water-soluble polymer, in particular a water-soluble polymer film, as the sealing material, since this can be laminated very well on the polymer film and thus a composite or a laminate made of polymer film and water-soluble films can be manufactured easily, which is then thermoformed.

If such a toilet rim block cage with a suspension device, to which such a container with cleaning agent is fixed, wherein the openings in the container are sealed with a gas-tight water-soluble material, is now washed over by means of flush water during use with the first flushing, the flush water flows over the water-soluble material and dissolves this, such that the openings become accessible and water gets into the interior of the container and cleaning agent located there can dissolve little by little.

In an alternative, the openings in the polymer film are sealed with a substantially gas-tight label, such that the openings are sealed in a gas-tight manner.

If the removable gas-tight material is a non-water-soluble label, this can simply be removed from the openings before the use of the basket, for example.

Due to the fact that the container can be manufactured by means of the thermoforming process and not by means of injection moulding, containers with a lighter weight and thus much less polymer material can be obtained. After the containers are generally thrown away after emptying, containers with a smaller polymer mass are environmentally friendly and also more cost-effective.

A further advantage of the thermoforming of containers with openings in accordance with the invention is that the tool moulds for the thermoforming process can be manufactured much more simply and cost-effectively than the tool moulds for the injection moulding process. The biggest costs in the injection moulding process are a result of the costs for the injection mould. The method according to the invention with the much more cost-effective thermoforming moulds is thus in particular suitable for quantities, which are not too large, of containers with openings or when differently shaped containers with openings are desired. According to the method in accordance with the invention, containers for almost every form of cleaning agent can be manufactured cost-effectively and simply.

A further advantage of the container according to the invention is that this can be manufactured from a transparent polymer material and thus the design of the respective cleaning agent is clearly visible to the user.

A further advantage of the thermoforming according to the invention is the lower energy demand, compared to injection moulding.

As a polymer film material, every thermoplastic material which can be manufactured in the form of films can in principle be used. In order to be able to be manufactured by means of thermoforming, the polymer films should be substantially gas-tight. Preferably, a film material made of polyethylene terephthalate (PET), polyethylene (PE), polypropylene (PP), polystyrene (PS), polyvinylchloride (PVC) is used. The use of recycled material or multi-layer films such as PS-EVOH-PE or PP-EVOH-PE is also possible (EVOH: ethylene vinyl alcohol copolymer).

The polymer film material should have a certain dimensional stability and stability against mechanical stress during storage, transport and use. In addition, the film must have a certain resistance against external influences such as moisture or chemicals.

In general, the thickness of the polymer film is between 70 and 700 μm.

A water-soluble polymer material, in particular a polymer film, but also a non-water-soluble label made of paper or plastic can be used as the sealing material.

Polyvinyl alcohol, polyvinyl pyrrolidone, polyalkylene oxide, polyacrylate, polyacrylamide, polyamide, acryl maleic acid copolymers, polysaccharide, gelatine, cellulose derivatives in general such as hydroxyethyl-, methy- and propyl-cellulose, maltodextrins etc can be used as a water-soluble sealing material. Sealing materials based on renewable resources such as soya, milk proteins or starch, for example, can also be used. Thermoplastic biodegradable granulate, which comprises caseinate or casein, plasticizing means such as water, glycerine, sorbitol, mannitol, maltitol or ethylene glycol, and a biodegradable polyester, for example poly(butylene-adipate-cobutylene-terephthalate), is also suitable as a sealing material. Such a thermoplastic biodegradable granulate is known from WO 2012/010421 A1.

These water-soluble sealing materials are preferably films and are preferably laminated onto the polymer film material in such a way that the polymer film material and the sealing material are substantially gas-tight. The adhesion can take place, for example, by means of PVA-solution, other solutions of water-soluble polymers or usual laminate adhesives or spray adhesives, as they are offered by the company Meyco as "spray adhesive, crystal-clear". An adhesion with water-soluble laminate adhesives, such as polyurethane-based adhesives, is also possible. Such adhesives are sold as a two-component adhesive BEST-PU 0587 by the company Best Klebstoffe GMbH & Co. KG, for example.

This sealing material film is preferably between 50 μm and 500 μm thick. Such films—for example, made of PVA—are available under the designation M8310 with a thickness of 88 μm from the company Monosol, LLC.

An adhesion with waterless laminate adhesives such as PU-based adhesives is also possible.

By "substantially gas-tight", it is understood in the context of the present invention to mean that the films are at least so gas-tight that negative pressure or compressed air can be applied temporarily in order to deform the films into the desired three-dimensional shape. Preferably, the films are so thick that they form a barrier for water vapour or fragrances over a certain period.

In particular, "substantially gas-tight" is understood in the context of the present invention to mean that the concentration of a fragrance in a cleaning agent, which is packaged with a film, has decreased by at most 30% after 2 weeks, preferably at most by 20% after 2 weeks and particularly preferably at most by 20% after 6 weeks.

In a preferred variant, the container is trough-shaped and has a peripheral flat edge which runs perpendicularly to the trough walls, said edge serving for fixing, in particular adhesion or welding, to the lid. Openings for fixing to the suspension device can be provided on the lid.

The suspension device is generally manufactured by means of injection moulding. It has a hook for fixing on the toilet rim and means for fixing the container. In principle, several containers can also be fixed to one suspension device.

In order to keep the contamination of the suspension device in the toilet bowl as small as possible, in a preferred embodiment, the container with the container lid, thus all parts projecting into the toilet bowl, is thrown away after emptying. If the fixing means are now provided on the container lid and if these and thereby also the corresponding fixing means are located on the suspension device in the case of means fixed in the bowl above the cleaning agent, the probability of the contamination of the reusable suspension device is low.

In a further variant, the container lid is a part of the suspension device and is moulded onto this in the lower region. The container with the cleaning agent can then be clipped onto the lid located on the suspension device, for example, and removed again after emptying. However, this variant has the disadvantage that the user has to touch the end of the suspension device with the lid projecting into the toilet bowl when filling.

Figure 2:
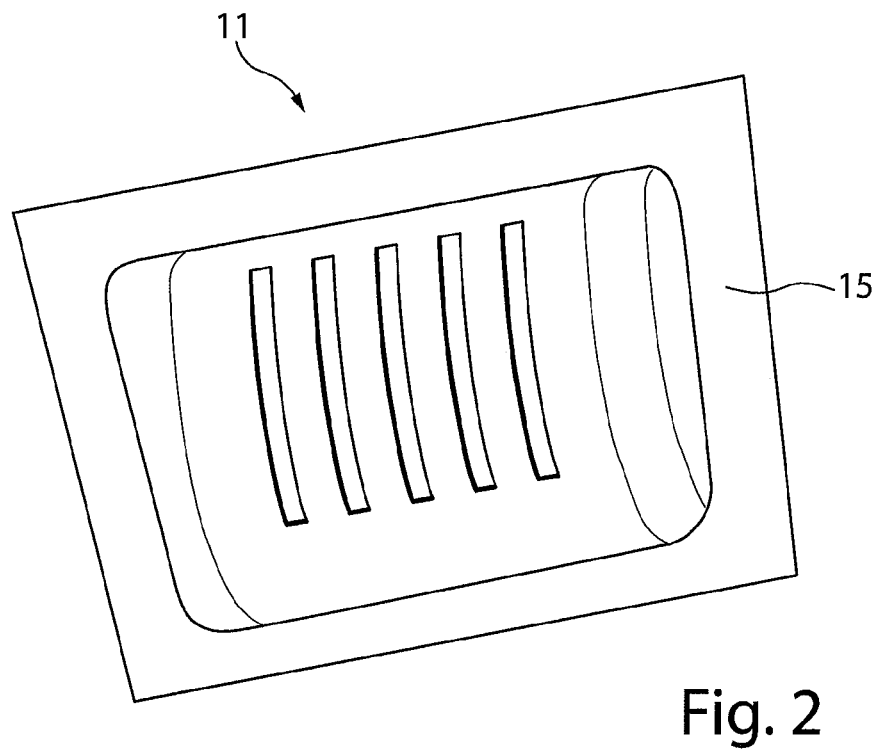
Figure 3A:
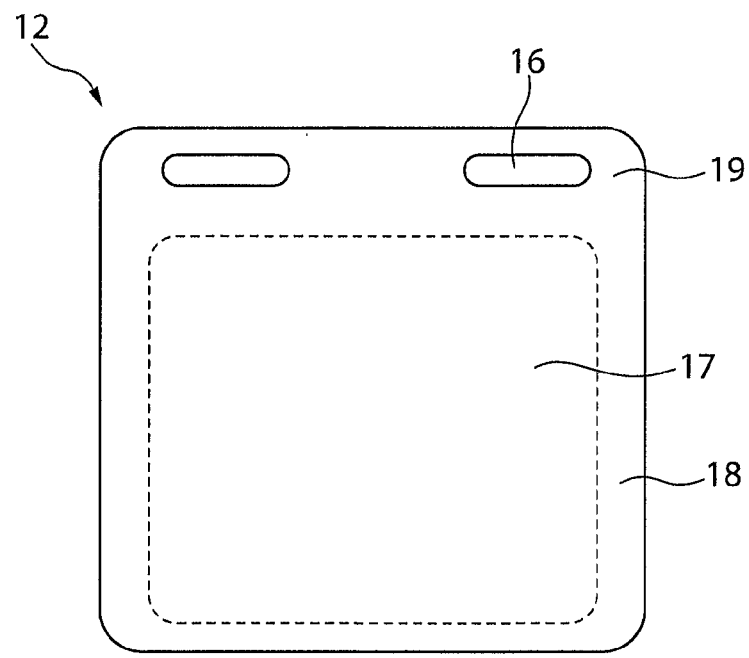
Figure 3B:
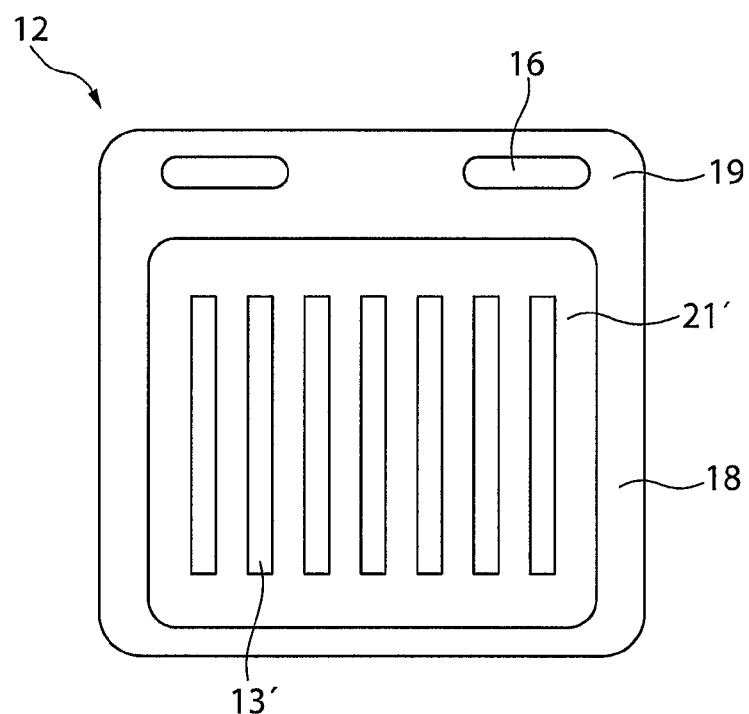
Figure 4:
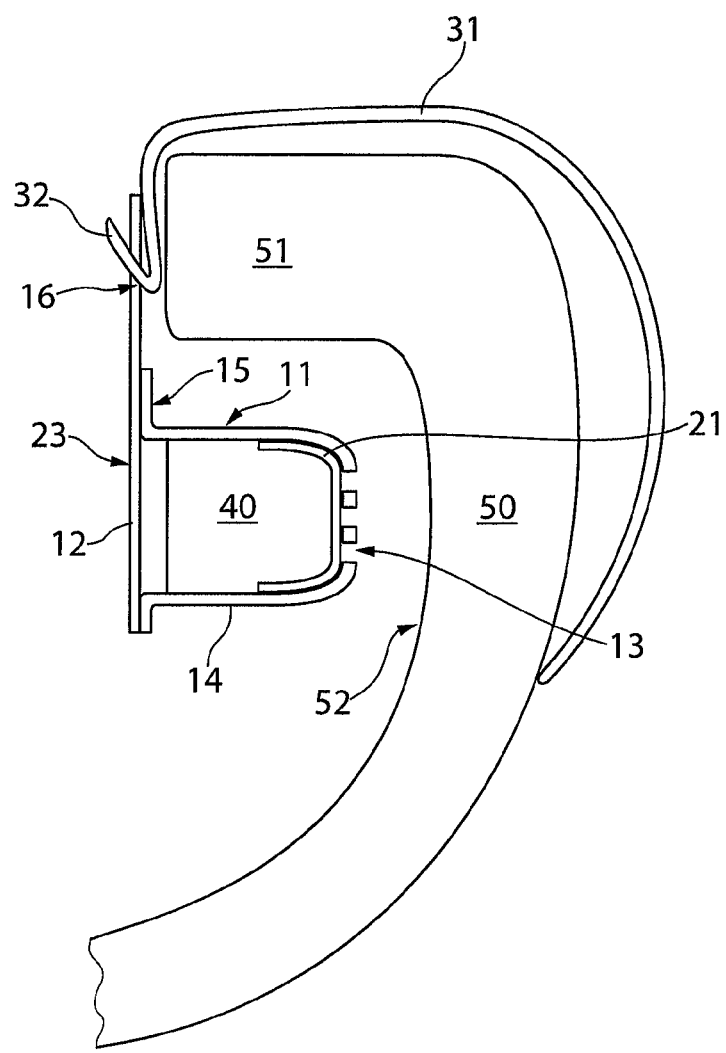
Figure 5:
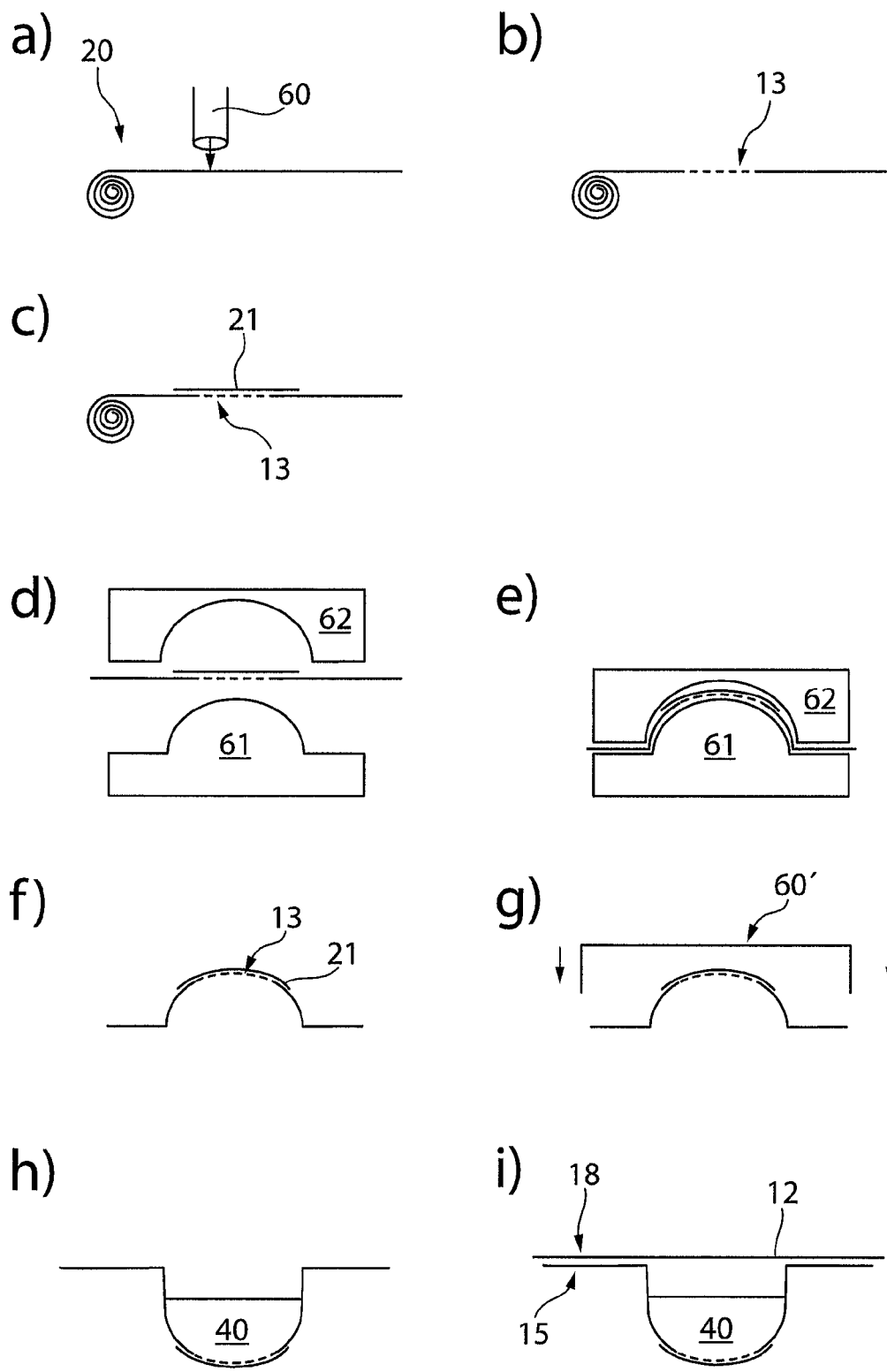
Figure 6:
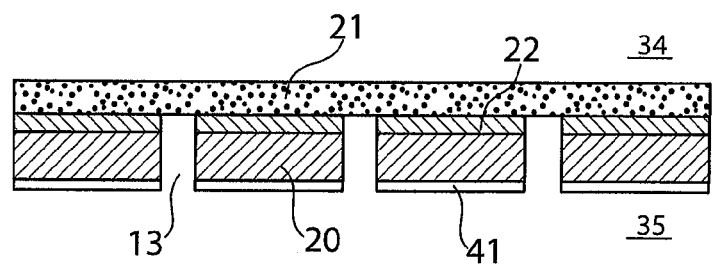

The present invention is described in more detail using exemplary embodiments. They show:

FIG. 1: the view of the outer side of the container according to the invention,

FIG. 2: the plan view of the inner side of the container from FIG. 1,

FIGS. 3a and 3b: two variants of the container lid,

FIG. 4: the container from FIGS. 1 to 3 on a suspension device in a toilet bowl, FIG. 5: a schematic depiction of the method according to the invention having the steps a) to i) and FIG. 6: a schematic depiction of the layer sequence of the film cross-section of the container.

FIGS. 1 and 2 show a container 11, which has a semi-cylindrical shell 14 having a peripheral edge 15. The semi-cylindrical shell 14 serves to receive the cleaning agent 40. FIG. 1 shows the view of the outer side of the container 11, thus the view of the side which, when the container 11 is hung in the toilet bowl 50, faces in the direction of the toilet bowl wall 52, cf. FIG. 4. FIG. 2 shows the inner side of the open container 11 in a plan view.

In the shell 14, five elongated openings 13 are provided which are sealed in a gas-tight manner with a film piece as a sealing material 21. In a first embodiment, the film piece 21 is a water-soluble film which is adhered to the outer side 23 of the container 11 onto the openings 13.

The film piece 21 was adhered to the openings 13, which are punched into the polymer film 20, before the thermo-forming process, as is described further below.

This water-soluble film 21 can be removed by being washed over with water during the first use and thus the openings 13, through which the water can get to the surface of the cleaning agent 40, can be washed free.

Naturally, the shell 14 can also have another shape, as long as this can be manufactured by means of thermoforming. The number, shape and arrangement of the openings 13 can naturally also vary. Due to the size and number of the openings 13, the flushing behaviour and the rinse rate of the cleaning agent 40 can be changed.

On the upper end of the shell 14 which is open upwards, a flat edge 15 circulating outwards extends, cf. FIG. 2. The edge 15 serves to seal the container 11 to the container lid 12 in a preferably gas-tight manner after filling with the cleaning agent 40. Here, suitable and usual sealing methods such as heat sealing, ultrasonic sealing or even adhesion with an adhesive such as polyvinyl alcohol solution, for example, can be used. The width of the edge 15 is preferably between 2 mm and 10 mm.

In FIG. 3, two variants of the container lid 12 are depicted. FIG. 3a shows a simple container lid 12 made from a non-water-soluble polymer film 20, which, with its dashed region 17, covers the openings 13 in the shell 14, and is connected to the edge 15 of the container 11 with its edge 18. For an appealing appearance, the visible side 23 of the container lid 12 in the toilet bowl 50 is decoratively designed.

Above the covering region 17, a film section 19 with longitudinal fixing slits 16 is provided. Fixing hooks 32 provided on the suspension device 31 can be inserted through these fixing slits 16, such that the container 11 with the container lid 12 and filled with the cleaning agent 40 can be fixed on the suspension device 31 on the edge of the toilet bowl 50, cf. FIG. 4.

In the second lid variant in FIG. 3b, the container lid 12 consisting of a non-water-soluble plastic film 20' also has punched openings 13', which can also be sealed with a water-soluble film 21', corresponding to the previously described container 11. The container lid 12 is preferably flat, but it can also be three-dimensionally formed, correspondingly to the container 11, by punching from a film, sealing the openings 13 and subsequent thermoforming.

Corresponding to the previously described container 11, this water-soluble film 21' is also rinsed away during the first washing over.

This container 11 with openings 13, which is covered by the container lid 12 with openings 13', thereby allows the flush water to access the cleaning agent 40 through the shell 14 and through the container lid 12 after the free-rinsing of the sealing material 21 or 21' in the flush water flow.

The method according to the invention is schematically depicted in FIGS. 5a to 5i.

Gas-impermeable polymer film 20 is unwound from a roll, and five longitudinal openings 13 are punched with a punch 60 into the flat polymer film 20 in a surface of approximately 40×60 mm, cf. FIG. 5a,b. Via the openings 13, a water-soluble PVA film is now adhered as a gas-tight sealing material 21 with polyvinyl alcohol solution as an adhesive, cf. FIG. 5c, such that the openings 13 are sealed in a gas-tight manner.

The PVA film 21 can also be unwound from a roll and can also be completely laminated onto the polymer film 20 with the punched openings 13, such that a composite or laminate is obtained.

It is essential for the method step in FIG. 5c that the composite of the polymer film 20 with the openings 13 and the sealing material 21 is gas-tight.

Subsequently, the composite of the polymer film 20 and the sealing material 21 is heated in a heating station on one or both sides. The pre-stretcher 61 and the thermoforming tool 62 pass through the softened film plane and already roughly predetermine the finished contour, cf. 5d,e. Then compressed air comes from one side and a vacuum from the other side, in order to bring the film quickly and powerfully to the water-cooled wall (contour) of the moulding tool (not depicted). The air escapes between the film composite 20, 21 and the tool through small holes or slits. The cooled, now firm film composite 20, 21 is separated from the moulding tool and is brought to the punching station 60' in the next working cycle, cf. FIG. 5f, g.

The cooled container 11 with the openings 13 and the laminated water-soluble film 21 is now filled with the hot cleaning agent mass 40 and left to cool (FIG. 5h). Instead of a hot, melted cleaning agent mass, a firm, for example extruded or pelleted, cleaning agent moulded body can also be placed into the cavity.

Subsequently, the container 11 with a container lid 12, which is sealed or adhered onto the edge 15 of the container 11, is sealed in a gas-tight manner, FIG. 5i.

FIG. 6 schematically shows the layer sequence of the film composite of the container 11.

The composite consists of an external PVA film 21, which disintegrates when it comes into contact with water, and one or several internal polymer films 20 with punched openings 13.

The PVA film 21 is adhered to the punched polymer film 20 with a laminating adhesive 22. After the first washing over with water, the openings 13 become permeable, since the PVA film 21 disintegrates such that water from the exterior space 34 can get into the interior space 35 of the container 11 and dissolves the cleaning agent 40 located there.

The geometry and position of the openings 13 is selected in such a way that these are not changed or influenced, or are changed or influenced as little as possible, by the forming process during thermoforming.

The exterior sealing material 21 is connected to the interior perforated film layer 20 by means of an elastic laminating adhesive 22, which is suitable for the thermoforming. The laminating adhesive 22 is applied onto the polymer film 20, in order not to influence the dissolving behaviour of the PVA film 21 in the region of the openings 13. The laminating adhesive 22 can be based on polyurethane and can be a chemically curing 2-component-PU-adhesive.

Optionally, a sealing layer 41 can be applied on the side of the polymer film 20 facing in the direction of the interior space 35, in order to enable an easier connection between the edge 15 of the shell 14 and the container lid 12 with a common heat-sealing method. By way of example, this layer 41 can consist of polyethylene or polypropylene.

What is claimed is:

1. A method for manufacturing a container (11) having at least one opening (13) for storing cleaning agent (40) for a toilet rim block cage (30), characterised in that a polymer film (20) is provided and the at least one opening (13) is punched into the polymer film (20), the at least one opening (13) is sealed with a substantially gas-tight and removable sealing material (21),
wherein said substantially gas-tight and removable sealing material is configured to limit a decrease in a concentration of a fragrance in the cleaning agent to 30 percent or less after two weeks of the cleaning agent being sealed within the container, and the film (20) having the sealed opening (13) is subsequently three-dimensionally deformed by means of thermoforming.

2. The method according to claim 1, characterised in that the substantially gas-tight and removable sealing material (21) is a film and is laminated onto the polymer film (20) having the at least one opening (13).

3. The method according to claim 1, characterised in that the substantially gas-tight and removable sealing material (21) is a water-soluble material, a self-adhesive label or a pull tab.

4. The method according to claim 3, characterised in that the water-soluble material is a water-soluble film selected from the group consisting of polyvinyl alcohol, polyvinyl pyrrolidone, polyalkylene oxide, polyacrylate, polyacrylamide, polyamide, acryl maleic acid copolymers, polysaccharide, gelatine, cellulose derivatives, in particular hydroxyethyl-, methy- and propyl-cellulose, maltodextrins or thermoplastic biodegradable granulates or renewable resources.

5. The method according to claim 1, characterised in that the polymer film (20) is selected from the group consisting of PET, polyethylene, polypropylene, polystyrene or multi-layered films.

6. The method according to claim 5, characterised in that the substantially gas-tight and removable sealing material (21) is a water-soluble material, a self-adhesive label or a pull tab.

7. The method according to claim 6, characterised in that the water-soluble material is a water-soluable film selected from the group consisting of polyvinyl alcohol, polyvinyl pyrrolidone, polyalkylene oxide, polyacrylate, polyacrylamide, polyamide, acryl maleic acid copolymers, polysaccharide, gelatine, cellulose derivatives, in particular hydroxyethyl-, methy- and propyl-cellulose, maltodextrins, and thermoplastic biodegradable granulates or renewable resources.

* * * * *